United States Patent [19]
Kim

[11] Patent Number: 5,936,745
[45] Date of Patent: Aug. 10, 1999

[54] METHOD AND APPARATUS FOR CONVERTING A RESOLUTION IN A FACSIMILE

[75] Inventor: Yong-Seop Kim, Kyeongki-Do, Rep. of Korea

[73] Assignee: Daewoo Electronics Co., Ltd., Seoul, Rep. of Korea

[21] Appl. No.: 08/865,982

[22] Filed: May 30, 1997

[30] Foreign Application Priority Data

May 31, 1996 [KR] Rep. of Korea ........................ 96-19411

[51] Int. Cl.[6] .............................. H04N 1/40; H04N 1/393
[52] U.S. Cl. ........................................... 358/445; 358/451
[58] Field of Search ................................... 358/445, 451, 358/448, 452, 501, 444, 474, 494, 409, 417; 382/270, 298, 299

[56] References Cited

U.S. PATENT DOCUMENTS

| | | | |
|---|---|---|---|
| 4,614,977 | 9/1986 | Kawahara et al. | 358/260 |
| 4,809,345 | 2/1989 | Tabata et al. | 382/47 |
| 4,876,604 | 10/1989 | Nobula | 358/400 |
| 5,299,028 | 3/1994 | Kwarta | 358/445 |
| 5,341,221 | 8/1994 | Mikada | 358/400 |
| 5,535,007 | 7/1996 | Kim | 358/451 |
| 5,566,003 | 10/1996 | Hara et al. | 358/448 |
| 5,647,026 | 7/1997 | Kwarta | 382/270 |

*Primary Examiner*—Leo H. Boudreau
*Assistant Examiner*—Shawn Cage
*Attorney, Agent, or Firm*—Pillsbury Madison & Sutro LLP

[57] ABSTRACT

A method and apparatus for converting a resolution of a document to be transmitted at a high rate is disclosed. Horizontal converting section reduces or magnifies an input signal in accordance with the horizontal resolution specified by both a conversion magnification signal and a reduction/magnification mode signal in response to reference clock signals, and provides a horizontal conversion signal horizontally converted and a horizontal dot signal. Vertical converting section reduces or magnifies the horizontal conversion signal from the horizontal converting section in accordance with the vertical resolution specified by the conversion magnification signal on the basis of a line start signal, the conversion magnification signal and the mode signal, and provides a vertical conversion signal. Address generating section provides an address signal on the basis of the line start signal. Line memory section stores the horizontal line signal or outputs the stored horizontal line signal on the basis of the memory control signal from the vertical converting section and the address signal from the address generating section, and provides a read horizontal line signal to the vertical converting section. Both the vertical conversion signal whose resolution is converted and the horizontal dot signal are obtained from the input signal on the basis of the state transition sequences which accompany the conversion modes of a first clock generating circuit, a second clock generating circuit and a sequence control circuit. Therefore, the resolution conversion between any two of the G4 standard resolutions is executed at a high rate by the resolution converting apparatus having a simplified hardware configuration.

19 Claims, 3 Drawing Sheets

METHOD AND APPARATUS FOR CONVERTING A RESOLUTION IN A FACSIMILE

BACKGROUND OF THE INVENTION

1. Field of the Invention

The present invention relates to a method for converting a resolution of a document to be transmitted at a high rate and which meets the standard resolution requirements of a facsimile apparatus of a G4 type, and an apparatus thereof.

2. Description of the Prior Art

After a modern facsimile apparatus has been invented by using a phototube of the vacuum type in 1925, the CCITT (International Telegraph and Telephone Consulting Committee of the International Telecommunications Union) recommended a facsimile apparatus of a G1 type in 1968. The G1 type facsimile apparatus spends about six minutes in transmitting a document which corresponds to one page of A4-sized paper. According to a G2 standard which was established in 1976, it takes less than three minutes to transmit a document corresponding to one page of A4-sized paper via the facsimile apparatus.

A G3 type facsimile apparatus which is widely used at present, was recommended in 1980. The G3 type facsimile apparatus can transmit a document corresponding to one page of A4-sized paper via ordinary telephone lines within about one minute. The G3 type facsimile apparatus reduces the document transmission time by using a method for reducing information.

On the other hand, a G4 type facsimile apparatus connects with the ISDN (Integrated Services Digital Network) as a communication terminal equipment. When compared with the G3 type facsimile apparatus, the G4 type facsimile apparatus can elevate the resolution of the transmitted document by up to four times, and can raise the transmission rate by more than seven times (up to twenty times). Also, since the G4 type facsimile apparatus connects with the ISDN, it can offer composite and various communication services that the next generation of information communication requires.

When the print resolution of a receiving facsimile terminal is different from that of an originating facsimile terminal, in order to adjust the different print resolutions, a letter of advice relating to G4 standard of the ITU (International Telecommunication Union) specifies four resolutions such as 200, 240, 300 and 400 [dots per inch] for the resolution conversion of the facsimile apparatus. The apparatuses for converting the resolution are embodied by means of software or hardware. However, the resolution converting apparatuses which are embodied by means of software, spend a lot of time to process.

For example, in the U.S. Pat. No. 4,876,604 granted to Hiroshi Nobuta, since the structure having image resolution converting circuits arranged at several positions in order to communicate between all the combinations of apparatuses which operate with different image resolutions, is complicated and costly, there is disclosed an image communication apparatus which has a memory for storing image data and which comprises image data supply means for supplying first and second image data of different resolutions, respectively, and an image data resolution converter connected between the image data supply means and the memory to convert the resolution of at least one of the first and second image data such that the resolution of the first and second image data supplied to the memory is unified.

The conventional facsimile apparatus as described above supports reduction/magnification ratio, e.g., 1/2-2 or 1/8-8 and not only performs all of the conversion functions with all of the magnifying powers, but also has the four kinds of resolutions specified in the letter of advice relating to G4 standard of the ITU. However, when the resolution converting apparatuses are embodied by means of hardware, the configuration thereof is complicated. When having three kinds of conversion functions for reduction, e.g., A3→A4, A3→B4 and B4→A4, the conventional facsimile apparatuses support only the reduction conversion mode which is frequently used, so the embodiment of the resolution converting apparatuses is simplified. However, the conventional facsimile apparatuses do not completely meet the G4 standard of the ITU.

SUMMARY OF THE INVENTION

Therefore, it is a first object of the present invention to provide a method for converting a resolution in a facsimile which meets the standard resolution requirements of a facsimile apparatus of a G4 type and thereby can convert the resolution of a document to be transmitted at a high rate.

It is a second object of the present invention to provide an apparatus for converting a resolution in a facsimile which meets the standard resolution requirements of the facsimile apparatus of the G4 type and thereby can convert the resolution of a document to be transmitted at a high rate.

In order to achieve the first object, the present invention provides the method for converting a resolution in a facsimile, which comprises:

(i) reducing or magnifying an input signal in accordance with the horizontal resolution specified by both a conversion magnification signal and a mode signal for reduction/magnification on the basis of a line start signal, a first clock signal equivalent to a reference clock signal and a second clock signal frequency-demultiplied by 2, and generating a horizontal conversion signal horizontally converted and a horizontal dot signal;

(ii) reducing or magnifying the horizontal conversion signal generated in step (i) in accordance with the vertical resolution specified by the conversion magnification signal on the basis of a line start signal, the conversion magnification signal and the mode signal, and generating a vertical conversion signal vertically converted and a memory control signal used in order to store or read out a horizontal line signal;

(iii) generating an address signal on the basis of the line start signal and the conversion magnification signal; and (iv) storing the horizontal line signal or reading out the stored horizontal line signal on the basis of the memory control signal generated in step (ii) and the address signal generated in step (iii), and generating a read horizontal line signal.

In order to achieve the second object, the present invention provides the apparatus for converting a resolution in a facsimile, which comprises:

horizontal converting means for reducing or magnifying an input signal in accordance with the horizontal resolution specified by both a conversion magnification signal and a mode signal for reduction/magnification on the basis of a line start signal, a first clock signal equivalent to a reference clock signal and a second clock signal frequency-demultiplied by 2, and for providing a horizontal conversion signal horizontally converted and a horizontal dot signal;

vertical converting means for reducing or magnifying the horizontal conversion signal generated from said horizontal converting means in accordance with the vertical resolution specified by the conversion magnification signal on the basis of a line start signal, the conversion magnification signal and the mode signal for reduction/magnification, and for providing a vertical conversion signal vertically converted and a memory control signal used in order to store or read out a horizontal line signal;

address generating means for providing an address signal on the basis of the line start signal; and line memory means for storing the horizontal line signal or outputting the stored horizontal line signal on the basis of the memory control signal from said vertical converting means and the address signal from said address generating means, and for providing a read horizontal line signal to said vertical converting means.

In the method and apparatus for converting a resolution in a facsimile, both the vertical conversion signal whose the resolution is converted and the horizontal dot signal are obtained from the input signal on the basis of the state transition sequences which accompany the conversion modes of a first clock generating circuit, a second clock generating circuit and a sequence control circuit. Therefore, the resolution conversion between any two of the G4 standard resolutions is executed at a high rate by the resolution converting apparatus having a simplified hardware configuration.

BRIEF DESCRIPTION OF THE DRAWINGS

The above objects and other advantages of the present invention will become more apparent by describing in detail a preferred embodiment thereof with reference to the attached drawings, in which.

DESCRIPTION OF THE PREFERRED EMBODIMENT

A description will be given below in detail with reference to the accompanying views to the configuration and the operation of a method and apparatus for converting a resolution in a facsimile according to an embodiment of the present invention.

Figure 1:
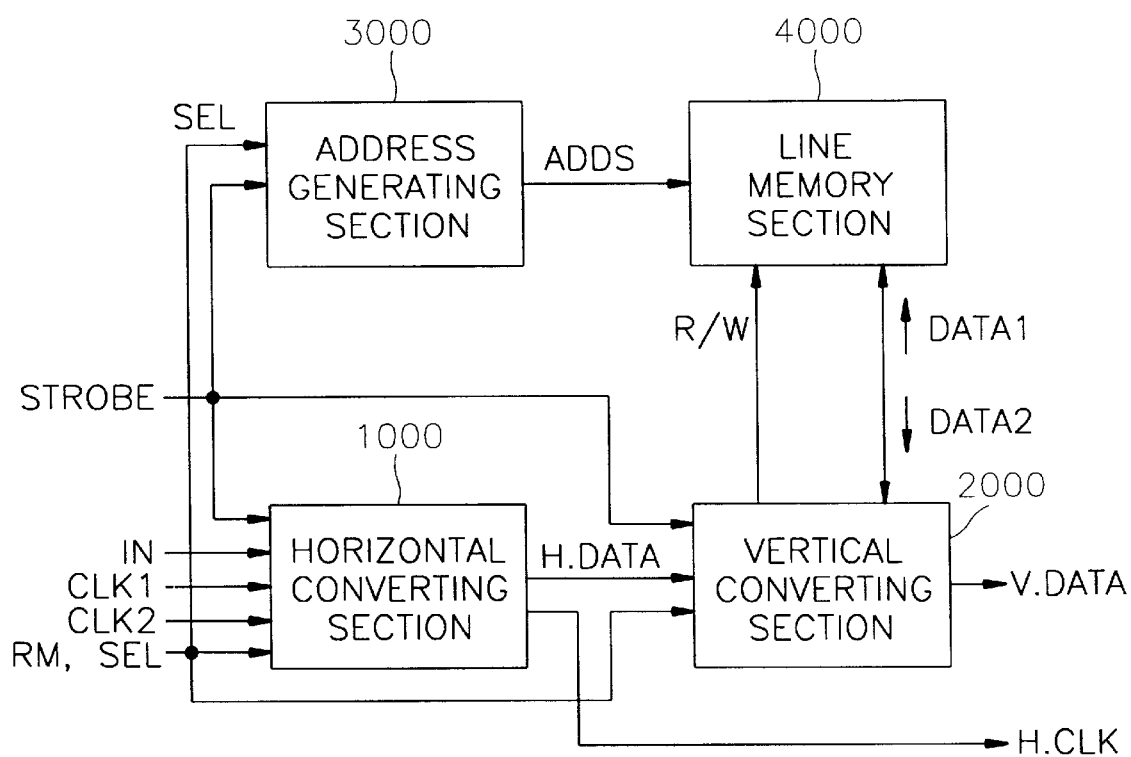
FIG. 1 is a circuit block diagram for showing the circuit configuration of an apparatus for converting a resolution in a facsimile according to an embodiment of the present invention.

FIG. 1 is a circuit block diagram for showing the circuit configuration of an apparatus for converting a resolution in a facsimile according to an embodiment of the present invention. As shown in FIG. 1, the resolution converting apparatus comprises a horizontal converting section 1000, a vertical converting section 2000, an address generating section 3000 and a line memory section 4000.

Horizontal converting section 1000 reduces or magnifies an input signal IN in accordance with the horizontal resolution specified by both a conversion magnification signal SEL and a mode signal RM for reduction/magnification (hereinafter, referred to as "mode signal") on the basis of a line start signal STROBE, a first clock signal CLK1 equivalent to a reference clock signal and a second clock signal CLK2 frequency-demultiplied by 2, and provides a horizontal conversion signal H.DATA horizontally converted and a horizontal dot signal H.CLK.

Vertical converting section 2000 reduces or magnifies the horizontal conversion signal H.DATA from horizontal converting section 1000 in accordance with the vertical resolution specified by conversion magnification signal SEL on the basis of a line start signal STROBE, conversion magnification signal SEL and mode signal RM, and provides a vertical conversion signal V.DATA vertically converted. Vertical converting section 2000 provides a memory control signal R/W used in order to store or read out a horizontal line signal DATA1.

Address generating section 3000 provides an address signal ADDS on the basis of line start signal STROBE and conversion magnification signal SEL. Address generating section 3000 starts to operate in response to line start signal STROBE and then increases address thereof by up to horizontal pixels specified by conversion magnification signal SEL in order to provide address signal ADDS. Address signal ADDS is periodically reset by address generating section 3000. A basic configuration of address generating section 3000 is that of a counter circuit.

Line memory section 4000 stores horizontal line signal DATA1 or outputs the stored horizontal line signal on the basis of memory control signal R/W from vertical converting section 2000 and address signal ADDS from address generating section 3000, and provides a read horizontal line signal DATA2 to vertical converting section 2000. Memory control signal R/W is applied to line memory section 4000 in order to use the previously stored horizontal line signal while the reduction/magnification conversion operation is being executed.

Figure 2:
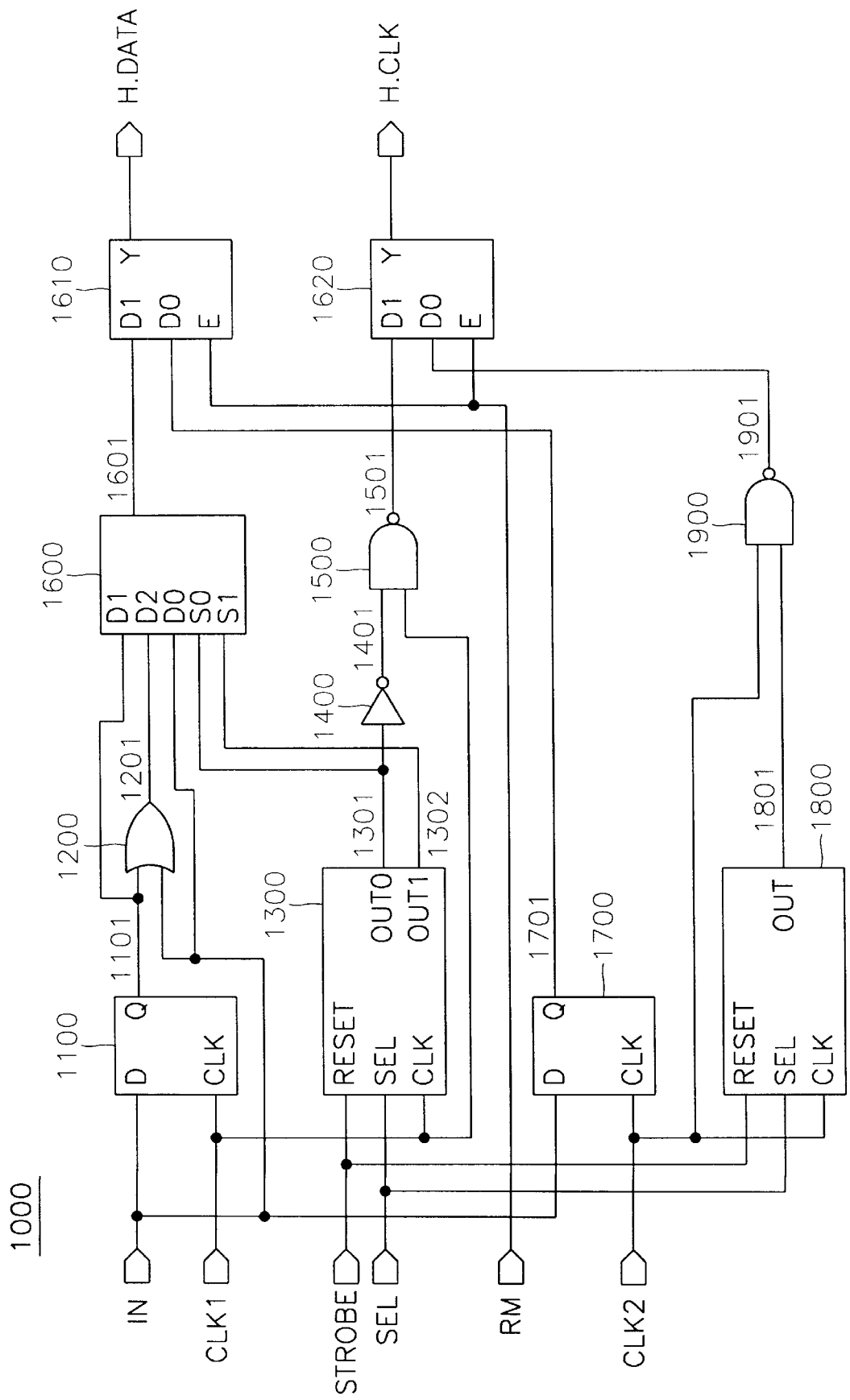
FIG. 2 is a circuit diagram for showing the circuit configuration of a horizontal converting section shown in FIG. 1.

FIG. 2 is a circuit diagram for showing the circuit configuration of a horizontal converting section shown in FIG. 1. As shown in FIG. 2, horizontal converting section 1000 comprises a first D flip-flop 1100, a first OR circuit 1200, a first clock generating circuit 1300, an NOT circuit 1400, a first NAND circuit 1500, a first multiplexer 1600, a second D flip-flop 1700, a second multiplexer 1610, a second clock generating circuit 1800, a second NAND circuit 1900 and a third multiplexer 1620.

First D flip-flop 1100 delays an input signal IN in response to first clock signal CLK1 and provides a first delayed input signal 1101.

First OR circuit 1200 OR-operates input signal IN to first delayed input signal 1101 from first D flip-flop 1100 and provides a first OR-operated signal 1201.

First clock generating circuit 1300 provides first and second reduction clock signals 1301 and 1302 corresponding to conversion magnification signal SEL on the basis of first clock signal CLK1. First clock generating circuit 1300 is reset in response to line start signal STROBE.

NOT circuit 1400 NOT-operates first reduction clock signal 1301 from first clock generating circuit 1300 and provides an NOT-operated reduction clock signal 1401.

First NAND circuit 1500 NAND-operates first clock signal CLK1 by NOT-operated reduction clock signal 1401 from NOT circuit 1400 and provides a first NAND-operated signal 1501.

While inputting first and second reduction clock signals 1301 and 1302 from first clock generating circuit 1300 as select-enable signals, first multiplexer 1600 selects a signal among first delayed input signal 1101 from first D flip-flop 1100, first OR-operated signal 1201 from first OR circuit 1200 and input signal IN, and provides a first multiplexed signal 1601.

Second D flip-flop 1700 delays input signal IN in response to second clock signal CLK2 and provides a second delayed signal 1701.

While inputting mode signal RM as the select-enable signal, second multiplexer 1610 selects either first multiplexed signal 1601 from first multiplexer 1600 or second delayed input signal 1701 from second D flip-flop 1700 and provides a horizontal conversion signal H.DATA.

Second clock generating circuit 1800 provides a magnification clock signal 1801 responding to conversion magnification signal SEL on the basis of second clock signal CLK2. Second clock generating circuit 1800 is reset in response to line start signal STROBE.

Second NAND circuit 1900 NAND-operates magnification clock signal 1801 from second clock generating circuit 1800 by second clock signal CLK2 and provides a second NAND-operated signal 1901.

While inputting mode signal RM as the select-enable signal, third multiplexer 1620 selects a signal among mode signal RM, first NAND-operated signal 1501 from first NAND circuit 1500 and second NAND-operated signal 1901 from second NAND circuit 1900, and provides a horizontal dot signal H.CLK.

Figure 3:
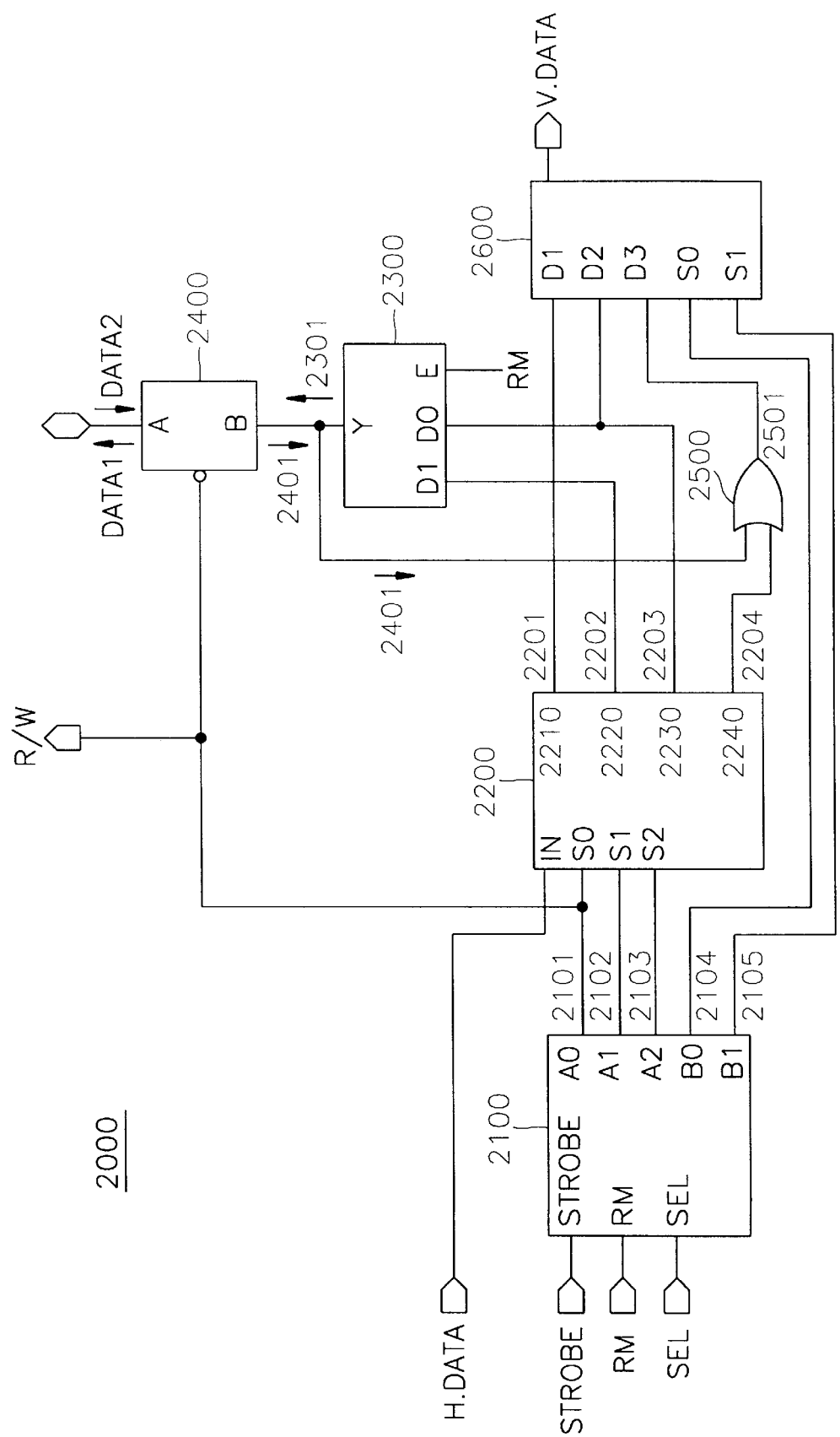
FIG. 3 is a circuit diagram for showing the circuit configuration of a vertical converting section shown in FIG. 1.

FIG. 3 is a circuit diagram for showing the circuit configuration of a vertical converting section shown in FIG. 1. As shown in FIG. 3, vertical converting section 2000 comprises a sequence control circuit 2100, a demultiplexer 2200, a fourth multiplexer 2300, a third state bus transceiver 2400, a second OR circuit 2500 and a fifth multiplexer 2600.

Sequence control circuit 2100 provides first to fifth select signals 2101 to 2105, which are used for vertically magnifying or reducing horizontal conversion signal H.DATA from horizontal converting section 1000, on the basis of line start signal STROBE, conversion magnification signal SEL and mode signal RM.

Demultiplexer 2200 demultiplexes the inputted horizontal conversion signal H.DATA and provides first to fourth demultiplexed signals 2201 to 2204 via first to fourth output terminals 2210, 2220, 2230 and 2240, which are specified by first to third select signals 2101 to 2103 from sequence control circuit 2100.

While mode signal RM is inputted as the select-enable signal, fourth multiplexer 2300 selects a signal among second and third demultiplexed signals 2202 and 2203 from demultiplexer 2200, and provides a fourth multiplexed signal 2301.

In response to first select signal 2101 from sequence control circuit 2100, third state bus transceiver 2400 is enabled to receive fourth multiplexed signal 2301 from fourth multiplexer 2300 in order to provide a horizontal line signal DATA1 to line memory section 4000 via an A terminal thereof, or receives read horizontal line signal DATA2 from line memory section 4000 in order to provide a B terminal output signal 2401.

Second OR circuit 2500 OR-operates B terminal output signal 2401 from third state bus transceiver 2400 to fourth demultiplexed signal 2204 from demultiplexer 2200 and provides a second OR-operated signal 2501.

While inputting fourth and fifth select signals 2104 and 2105 from sequence control circuit 2100 as the select-enable signals, fifth multiplexer 2600 selects a signal among first and third demultiplexed signals 2201 and 2203 from demultiplexer 2200 and second OR-operated signal 2501 from second OR circuit 2500, and provides a vertical conversion signal V.DATA.

A method for converting a resolution at a high rate by the resolution converting apparatus shown in FIGS. 1 to 3, will be described as follows.

In step S1, first D flip-flop 1100 delays input signal IN in response to first clock signal CLK1 and provides a first delayed input signal 1101. In step S2, first OR circuit 1200 OR-operates input signal IN to first delayed input signal 1101 generated in step S1, and provides a first OR-operated signal 1201. In step S3, first clock generating circuit 1300 provides first and second reduction clock signals 1301 and 1302 responding to a conversion magnification signal SEL on the basis of first clock signal CLK1. In step S4, NOT circuit 1400 NOT-operates first reduction clock signal 1301 generated in step S3 and provides an NOT-operated reduction clock signal 1401.

In step S5, first NAND circuit 1500 NAND-operates first clock signal CLK1 by NOT-operated reduction clock signal 1401 generated in step S4 and provides a first NAND-operated signal 1501. In step S6, while inputting first and second reduction clock signals 1301 and 1302 generated in step S3 as a select-enable signal, first multiplexer 1600 selects a signal among first delayed input signal 1101 generated in step S1, first OR-operated signal 1201 generated in step S2 and input signal IN, and provides a first multiplexed signal 1601. In step S7, second D flip-flop 1700 delays input signal IN in response to second clock signal CLK2 and provides a second delayed signal 1701. In step S8, while inputting mode signal RM as the select-enable signal, second multiplexer 1610 selects either first multiplexed signal 1601 generated in step S6 or second delayed input signal 1701 generated in step S7, and provides a horizontal conversion signal H.DATA.

In step S9, second clock generating circuit 1800 provides a magnification clock signal 1801 responding to conversion magnification signal SEL on the basis of second clock signal CLK2. In step S10, second NAND circuit 1900 NAND-operates magnification clock signal 1801 generated in step S9 by second clock signal CLK2 and provides a second NAND-operated signal 1901. In step S11, while inputting mode signal RM as the select-enable signal, third multiplexer 1620 selects either first NAND-operated signal 1501 generated in step S5 or second NAND-operated signal 1901 generated in step S10, and provides a horizontal dot signal H.CLK.

In step S12, sequence control circuit 2100 provides first to fifth select signals 2101 to 2105 used for vertically magnifying or reducing horizontal conversion signal H.DATA generated in step S8, on the basis of line start signal STROBE, conversion magnification signal SEL and mode signal RM. In step S13, demultiplexer 2200 demultiplexes the inputted horizontal conversion signal H.DATA in response to first to third select signals 2101 to 2103 generated in step S12, and provides first to fourth demultiplexed signals 2201 to 2204. In step S14, while mode signal RM is inputted as the select-enable signal, fourth multiplexer 2300 selects a signal among second and third demultiplexed signals 2202 and 2203 generated in step S13 and provides a fourth multiplexed signal 2301.

In step S15, a third state bus transceiver 2400 receives fourth multiplexed signal 2301 generated in step S14 while being enabled to do so by first select signal 2101 generated in step S12, and provides a horizontal line signal DATA1. In step S16, third state bus transceiver 2400 receives read horizontal line signal DATA2 while being NOT-enabled by first select signal 2101 generated in step S12, and provides a B terminal output signal 2401. In step S17, second OR circuit 2500 OR-operates B terminal output signal 2401 generated in step S16 to fifth demultiplexed signal 2205 generated in step S13, and provides a second OR-operated signal 2501. In step S18, while inputting as the select-enable signals fourth and fifth select signals 2104 and 2105 generated in step S12, fifth multiplexer 2600 selects a signal among first and third demultiplexed signals 2201 and 2203 generated in step S13 and second OR-operated signal 2501 generated in step S17, and provides a vertical conversion signal V.DATA.

In step S19, address generating section 3000 provides an address signal ADDS on the basis of line start signal STROBE and conversion magnification signal SEL. In step S20, line memory section 4000 stores horizontal line signal DATA1 or outputs the stored horizontal line signal on the basis of first select signal 2101 equivalent to memory control signal R/W generated in step S12 and address signal ADDS generated in step S19, and provides a read horizontal line signal DATA2.

Step S3 further comprises the substep of generating magnification clock signal 1801 for disabling input signal IN, which is equivalent to an unnecessary clock signal, in synchronization with second clock signal CLK2 having a period twice as fast as that of the first clock signal CLK1. Step S6 further comprises the substep of generating a predetermined reduced picture signal while first and second reduction clock signals 1301 and 1302 are being applied. Steps S3 and S9, and S12 respectively have the state transition sequences which are based on the conversion mode so that both vertical conversion signal V.DATA and horizontal dot signal H.CLK respectively having converted resolutions are provided.

Hereinafter, a description of the operation of the apparatus for converting a resolution in a facsimile according to the embodiment of the present invention which has the aforementioned configuration, will be provided while laying stress on the predetermined state transition sequences which are generated from the first and second clock generating circuits and the sequence control circuit in response to the conversion magnification signal.

TABLE 1

| SEL | reduction mode [DPI] | magnification mode [DPI] |
|-----|----------------------|--------------------------|
| 000 | 400 → 300 | 300 → 400 |
| 001 | 400 → 240 | 240 → 400 |
| 010 | 400 → 200 | 200 → 400 |
| 011 | 300 → 240 | 240 → 300 |
| 100 | 300 → 200 | 200 → 300 |
| 101 | 240 → 200 | 400 → 240 |

Table 1 explains how the resolution (expressed by the unit of DPI) changes during the reduction or magnification mode in accordance with the signal level of conversion magnification signal SEL. First of all, as explained in Table 1, conversion magnification signal SEL has 3 bits of binary data during the magnification or reduction mode and exercises up to a double magnification function or a half reduction function. Conversion magnification signal SEL is so configured that the conversion can be executed between any two of the G4 standard resolutions.

TABLE 2

| SEL | reduction mode | state transition sequences of 1301 and 1302 | conversion rate |
|-----|---------------|---------------------------------------------|-----------------|
| 000 | 400 → 300 | 00→00→01→10 | 4:3 |
| 001 | 400 → 240 | 00→01→10→01→10 | 5:3 |
| 010 | 400 → 200 | 01→10 | 2:1 |
| 011 | 300 → 240 | 00→00→00→01→10 | 5:4 |
| 100 | 300 → 200 | 00→01→10 | 3:2 |
| 101 | 240 → 200 | 00→00→00→00→01→10 | 6:5 |

Table 2 explains the interrelation among the signal level of conversion magnification signal SEL, the resolution conversion during the reduction mode, the state transition sequences of first and second reduction clock signals 1301 and 1302, and the conversion rate. First and second reduction clock signals 1301 and 1302 generated from first clock generating circuit 1300 in order to have predetermined state transition sequences, respectively have the state transition sequences explained in Table 2. First and second reduction clock signals 1301 and 1302 are respectively applied to first and second select terminals S0 and S1 of first multiplexer 1600 so that a predetermined picture signal to be reduced is outputted.

TABLE 3

| SEL | magnification mode | state transition sequence of 1801 | conversion rate |
|-----|-------------------|-----------------------------------|-----------------|
| 000 | 300 → 400 | 1→0→1→0→1→1 | 3:4 |
| 001 | 240 → 400 | 1→0→1→1→1→1 | 3:5 |
| 010 | 200 → 400 | 1→0 | 1:2 |
| 011 | 240 → 300 | 1→0→1→0→1→0→1→1 | 4:5 |
| 100 | 200 → 300 | 1→0→1→1 | 2:3 |
| 101 | 200 → 240 | 1→0→1→0→1→0→1→0→1→1 | 5:6 |

Table 3 explains the interrelation among the signal level of conversion magnification signal SEL, the resolution conversion during the magnification mode, the state transition sequence of magnification clock signal 1801 and the conversion rate. Next, while the magnification conversion operation is being executed, first clock generating circuit 1800 outputs magnification clock signal 1801 having the predetermined state transition sequence explained in Table 3. First clock generating circuit 1800 is synchronized with second clock signal CLK2, which has a period twice as fast as that of first clock signal CLK1, and provides magnification clock signal 1801 for disabling the input signal which is equivalent to an unnecessary clock signal.

Table 4 explains the interrelation among the signal level of conversion magnification signal SEL, the state transition sequences of first to third select signals 1201 to 2103, the state transition sequences of fourth and fifth select signals 1204 and 2105 and the conversion rate. Sequence control circuit 2100 for the vertical resolution conversion provides first to fifth select signals 2101 to 2105 (See FIG. 3) which respectively have the predetermined state transition sequences explained in Table 4.

TABLE 4

| conversion mode | SEL | state transition sequences of 2101, 2102 and 2103 | state transition sequences of 2104 and 2105 | conversion rate |
|---|---|---|---|---|
| reduction (RM = 1) | 000 | 000→000→001→100 | 00→00→XX→10 | 4:3 |
| | 001 | 000→001→100→001→100 | 00→XX→10→XX→10 | 5:3 |
| | 010 | 000→100 | XX→00 | 2:1 |
| | 011 | 000→000→000→001→100 | 00→00→00→XX→10 | 5:4 |
| | 100 | 000→001→100 | 00→XX→10 | 3:2 |
| | 101 | 000→000→000→000→001→100 | 00→00→00→00→XX→10 | 6:5 |
| magnification (RM = 0) | 000 | 000→000→010→011 | 00→00→01→10 | 3:4 |
| | 001 | 000→010→011→010→011 | 00→01→10→01→10 | 3:5 |
| | 010 | 010→011 | 01→10 | 1:2 |
| | 011 | 000→000→000→010→011 | 00→00→00→01→10 | 4:5 |
| | 100 | 000→010→011 | 00→01→10 | 2:3 |
| | 101 | 000→000→000→000→010→011 | 00→00→00→00→01→10 | 5:6 |

According to conversion magnification signal SEL, first to third select signals 2101 to 2103 determine whether horizontal conversion signal H.DATA is provided to line memory section 4000 and stored therein or whether horizontal conversion signal H.DATA is outputted via demultiplexer 2200 and fifth multiplexer 2600. Also, in harmony with first to third select signals 2101 to 2103, fourth and fifth select signals 2104 and 2105 determine which signal is multiplexed and outputted among the signals that are applied to input terminals D1 to D3 of fifth multiplexer 2600.

In demultiplexer 2200, first output terminal 2210 is a terminal for outputting first demultiplexed signal 2201 via fifth multiplexer 2600. Second output terminal 2220 is a terminal for sending second demultiplexed signal 2202 to line memory section 4000 via fourth multiplexer 2300 and via third state bus transceiver 2400 in order to store the horizontal line signal DATA1 in line memory section 4000. Third output terminal 2230 is a terminal for sending third demultiplexed signal 2203 to line memory section 4000 in order to store horizontal line signal DATA1 and for outputting third demultiplexed signal 2203 via fifth multiplexer 2600. Both fourth demultiplexed signal 2204 from fourth output terminal 2240 and B terminal output signal 2401 from third state bus transceiver 2400 are inputted to second OR circuit 2500. Second OR-operated signal 2501 from second OR circuit 2500 is outputted via fifth multiplexer 2600.

In the method and the apparatus for converting a resolution in a facsimile according to the present invention, both the vertical conversion signal whose resolution is converted and the horizontal dot signal are obtained from the input signal on the basis of the state transition sequences which accompany the conversion modes of a first clock generating circuit, a second clock generating circuit and a sequence control circuit. Therefore, the resolution conversion between any two of the G4 standard resolutions is executed at a high rate by the resolution converting apparatus having a simplified hardware configuration.

While the present invention has been particularly shown and described with reference to a particular embodiment thereof, it will be understood by those skilled in the art that various changes in form and detail may be effected therein without departing from the scope of the invention as defined by the appended claims.

What is claimed is:

1. A method for converting a resolution in a facsimile, said method comprising the steps of:

(i) reducing or magnifying an input signal in accordance with a horizontal resolution specified by both a conversion magnification signal which can designate a conversion rate among conversion rates of 4:3, 5:3, 2:1, 5:4, 3:2, and 6:5 for a reduction mode and 3:4, 3:5, 1:2, 4:5, 2:3, and 5:6 for a magnification mode and a mode signal for deciding a conversion mode between the reduction mode and the magnification mode on the basis of a line start signal, a first clock signal equivalent to a reference clock signal, and a second clock signal frequency-demultiplied by 2, and generating a horizontal conversion signal horizontally converted and a horizontal dot signal;

(ii) reducing or magnifying the horizontal conversion signal generated in step (i) in accordance with a vertical resolution specified by the conversion magnification signal which can designate the conversion rate and the mode signal on the basis of a line start signal, and generating a vertical conversion signal vertically converted and a memory control signal used in order to store or read out a horizontal line signal;

(iii) generating an address signal on the basis of the line start signal and the conversion magnification signal; and (iv) storing the horizontal line signal or reading out the stored horizontal line signal on the basis of the memory control signal generated in step (ii) and the address signal generated in step (iii), and generating a read horizontal line signal, wherein the steps (i) and (ii) have the state transition sequences based on the conversion mode so that both the vertical signal and the horizontal dot signal respectively having converted resolutions are provided.

2. The method for converting a resolution in a facsimile as claimed in claim 1, wherein said step (i) comprises the substeps of:

(A) delaying an input signal in response to a first clock signal and generating a first delayed input signal;

(B) OR-operating the input signal to the first delayed input signal generated in step (A) and generating a first OR-operated signal;

(C) generating first and second reduction clock signals responding to a conversion magnification signal on the basis of the first clock signal;

(D) NOT-operating the first reduction clock signal generated in step (C) and generating an NOT-operated reduction clock signal;

(E) NAND-operating the first clock signal by the NOT-operated reduction clock signal generated in step (D) and generating a first NAND-operated signal;

(F) selecting a signal among the first delayed input signal generated in step (A), the first OR-operated signal generated in step (B) and the input signal while inputting as a select-enable signal the first and second reduction clock signals generated in step (C), and generating a first multiplexed signal;

(G) delaying the input signal in response to the second clock signal and generating a second delayed signal;

(H) selecting either the first multiplexed signal generated in step (F) or the second delayed input signal generated in step (G) while inputting the mode signal as the select-enable signal, and generating a horizontal conversion signal;

(I) generating a magnification clock signal responding to the conversion magnification signal on the basis of the second clock signal;

(J) NAND-operating the magnification clock signal generated in step (I) by the second clock signal and generating a second NAND-operated signal; and (K) selecting either the first NAND-operated signal generated in step (E) or the second NAND-operated signal generated in step (J) while inputting the mode signal as the select-enable signal, and generating a horizontal dot signal.

3. The method for converting a resolution in a facsimile as claimed in claim 2, wherein said step (F) further comprises the substep of:

generating a predetermined picture signal to be reduced while the first and second reduction clock signals are being applied.

4. The method for converting a resolution in a facsimile as claimed in claim 2, wherein said step (C) further comprises the substep of:

generating a magnification clock signal for disabling the input signal equivalent to an unnecessary clock signal in synchronization with the second clock signal having a period twice as fast as that of the first clock signal.

5. The method for converting a resolution in a facsimile as claimed in claim 1, wherein said step (ii) comprises the substeps of:

(L) generating first to fifth select signals used for vertically magnifying or reducing the horizontal conversion signal generated in step (i) on the basis of the line start signal, the conversion magnification signal and the mode signal;

(M) demultiplexing the inputted horizontal conversion signal in response to first to third select signals generated in step (L) and generating first to fourth demultiplexed signals;

(N) selecting a signal among the second and third demultiplexed signals generated in step (M) while the mode signal is inputted as the select-enable signal, and generating a fourth multiplexed signal;

(O) receiving the fourth multiplexed signal generated in step (N) in response to the first select signal generated in step (L) in order to generate a horizontal line signal, or receiving the read horizontal line signal generated in step (iv) in order to generate a B terminal output signal;

(P) OR-operating the B terminal output signal generated in step (O) to the fourth demultiplexed signal generated in step (M) and generating a second OR-operated signal; and (Q) selecting a signal among the first to third demultiplexed signals generated in step (M) and the second OR-operated signal generated in step (P) while inputting as the select-enable signals the fourth and fifth select signals generated in step (L), and generating a vertical conversion signal.

6. The method for converting a resolution in a facsimile as claimed in claim 5, wherein said first select signal is used as the memory control signal.

7. The method for converting a resolution in a facsimile as claimed in claim 6, wherein said memory control signal is generated in order to use the previously stored horizontal line signal while the reduction/magnification conversion operation is being executed.

8. The method for converting a resolution in a facsimile as claimed in claim 1, wherein said conversion magnification signal is so configured that the conversion can be executed between any two of the G4 standard resolutions.

9. An apparatus for converting a resolution in a facsimile, said apparatus comprising:

horizontal converting means for reducing or magnifying an input signal in accordance with a horizontal resolution specified by both a conversion magnification signal which can designate a conversion rate among conversion rates of 4:3, 5:3, 2:1, 5:4, 3:2, and 6:5 for a reduction mode and 3:4, 3:5, 1:2, 4:5, 2:3, and 5:6 for a magnification mode and a mode signal for deciding a conversion mode between the reduction mode and the magnification mode on the basis of a line start signal, a first clock signal equivalent to a reference clock signal and a second clock signal frequency-demultiplied by 2, and for providing a horizontal conversion signal horizontally converted and a horizontal dot signal;

vertical converting means for reducing or magnifying the horizontal conversion signal generated from said horizontal converting means in accordance with a vertical resolution specified by the conversion magnification signal which can designate the conversion rate and the mode signal on the basis of a line start signal, and for providing a vertical conversion signal vertically converted and a memory control signal used in order to store or read out a horizontal line signal;

address generating means for providing an address signal on the basis of the line start signal and the conversion magnification signal; and line memory means for storing the horizontal line signal from said vertical converting means or for outputting the stored horizontal line signal on the basis of the memory control signal from said vertical converting means and the address signal from said address generating means, and for providing a read horizontal line signal to said vertical converting means.

10. The apparatus for converting a resolution in a facsimile as claimed in claim 9, wherein said horizontal converting means comprises:

a first D flip-flop for delaying an input signal in response to a first clock signal and for providing a first delayed input signal;

a first OR circuit for OR-operating the input signal to the first delayed input signal from said first D flip-flop and for providing a first OR-operated signal;

a first clock generating circuit for providing first and second reduction clock signals responding to the conversion magnification signal on the basis of the first clock signal, said first clock generating circuit being reset in response to the line start signal;

an NOT circuit for NOT-operating the first reduction clock signal from said first clock generating circuit and for providing an NOT-operated reduction clock signal;

a first NAND circuit for NAND-operating the first clock signal by the NOT-operated reduction clock signal from said NOT circuit and for providing a first NAND-operated signal;

a first multiplexer for selecting a signal among the first delayed input signal from said first D flip-flop, the first OR-operated signal from said first OR circuit and the input signal while inputting as a select-enable signal the first and second reduction clock signals from said first clock generating circuit, and for providing a first multiplexed signal;

a second D flip-flop for delaying the input signal in response to the second clock signal and for providing a second delayed signal;

a second multiplexer for selecting either the first multiplexed signal from said first multiplexer or the second delayed input signal from said second D flip-flop while inputting the mode signal as the select-enable signal, and for providing a horizontal conversion signal;

a second clock generating circuit for providing a magnification clock signal responding to the conversion magnification signal on the basis of the second clock signal, said second clock generating circuit being reset in response to the line start signal;

a second NAND circuit for NAND-operating the magnification clock signal from said second clock generating circuit by the second clock signal and for providing a second NAND-operated signal; and a third multiplexer for selecting either the first NAND-operated signal from said first NAND circuit or the second NAND-operated signal from said second NAND circuit while inputting the mode signal as the select-enable signal, and for providing a horizontal dot signal.

11. The apparatus for converting a resolution in a facsimile as claimed in claim 10, wherein said first and second reduction clock signals are respectively applied to the first and second select terminals of said first multiplexer such that a predetermined picture signal to be reduced is outputted.

12. The apparatus for converting a resolution in a facsimile as claimed in claim 10, wherein said first clock generating circuit is synchronized with the second clock signal having a period twice as fast as that of the first clock signal and provides a magnification clock signal for disabling the input signal equivalent to an unnecessary clock signal.

13. The apparatus for converting a resolution in a facsimile as claimed in claim 9, wherein said vertical converting means comprises:

a sequence control circuit for providing first to fifth select signals used for vertically magnifying or reducing the horizontal conversion signal from said horizontal converting means on the basis of the line start signal, the conversion magnification signal and the mode signal;

a demultiplexer for demultiplexing the inputted horizontal conversion signal and providing first to fourth demultiplexed signals via first to fourth output terminals thereof specified by the first to third select signals from said sequence control circuit;

a fourth multiplexer for selecting a signal among the second and third demultiplexed signals from said demultiplexer while the mode signal is being inputted as the select-enable signal, and for providing a fourth multiplexed signal;

a third state bus transceiver for receiving the fourth multiplexed signal from said fourth multiplexer while being activated in response to the first select signal from said sequence control circuit in order to provide a horizontal line signal to said line memory means, or for receiving the read horizontal line signal from said line memory means in order to provide a B terminal output signal;

a second OR circuit for OR-operating the B terminal output signal from said third state bus transceiver to the fourth demultiplexed signal from said demultiplexer and for providing a second OR-operated signal; and a fifth multiplexer for selecting a signal among the first and third demultiplexed signals from said demultiplexer and the second OR-operated signal from said second OR circuit while inputting as the select-enable signal the fourth and fifth select signals from said sequence control circuit, and for providing a vertical conversion signal.

14. The apparatus for converting a resolution in a facsimile as claimed in claim 13, wherein said first select signal is applied to said line memory means as the memory control signal.

15. The apparatus for converting a resolution in a facsimile as claimed in claim 14, wherein said memory control signal is generated in order to use the horizontal line signal previously stored in said line memory means while the reduction/magnification conversion operation is being executed.

16. The apparatus for converting a resolution in a facsimile as claimed in claim 13, wherein said first to third select signals from said sequence control circuit determine according to the conversion magnification signal whether the horizontal conversion signal is provided to said line memory means and stored therein or whether the horizontal conversion signal is outputted via said demultiplexer and said fifth multiplexer.

17. The apparatus for converting a resolution in a facsimile as claimed in claim 9, wherein said conversion magnification signal is so configured that the conversion can be executed between any two resolutions of the G4 standard resolutions.

18. The apparatus for converting a resolution in a facsimile as claimed in claim 9, wherein said first and second clock generating circuits included in said horizontal converting means, and said sequence control circuit included in said vertical converting means respectively have the state transition sequences based on the conversion mode so that both the vertical conversion signal and the horizontal dot signal respectively having converted resolutions are provided.

19. The apparatus for converting a resolution in a facsimile as claimed in claim 9, wherein said address generating means starts to operate in response to the line start signal and then increases the address thereof by up to horizontal pixels specified by the conversion magnification signal in order to provide the address signal, said address signal being periodically reset by said address generating means.

* * * * *